United States Patent
Amei

(10) Patent No.: US 7,123,490 B2
(45) Date of Patent: Oct. 17, 2006

(54) SYNCHRONOUS RECTIFYING SWITCHING POWER SOURCE CIRCUIT

(75) Inventor: Toshihiro Amei, Toyama (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 11/201,740

(22) Filed: Aug. 10, 2005

(65) Prior Publication Data

US 2006/0034108 A1 Feb. 16, 2006

(30) Foreign Application Priority Data

Aug. 11, 2004 (JP) .............................. 2004-234818

(51) Int. Cl.
*H02M 3/335* (2006.01)

(52) U.S. Cl. .................................................. 363/21.14

(58) Field of Classification Search ............. 363/21.06, 363/21.14, 84, 89, 125, 127
See application file for complete search history.

(56) References Cited

U.S. PATENT DOCUMENTS

| | | | |
|---|---|---|---|
| 5,768,118 A * | 6/1998 | Faulk et al. ................... | 363/72 |
| 6,069,804 A | 5/2000 | Ingman et al. | |
| 6,169,683 B1 * | 1/2001 | Farrington ................... | 363/127 |
| 6,246,593 B1 * | 6/2001 | Cheng ......................... | 363/17 |
| 6,396,333 B1 * | 5/2002 | Dubhashi et al. ........... | 327/424 |

FOREIGN PATENT DOCUMENTS

WO WO-03/094331 A1 11/2003

OTHER PUBLICATIONS

European Search Report for EP 05 25 4959 completed Nov. 9, 2005.
Patent Abstracts of Japan for 2000-350454 published on Dec. 15, 2000.

* cited by examiner

*Primary Examiner*—Adolf Berhane
(74) *Attorney, Agent, or Firm*—Darby & Darby

(57) ABSTRACT

In a synchronous rectification switching power supply circuit, a primary winding of a transformer and a main switching device are serially connected to a direct current input power supply. A secondary winding and a synchronous rectification device on the secondary side are serially connected between output terminals. A power supply apparatus has a capacitor charged with a voltage across the winding on the secondary side of the transformer by turning the main switching device on and off. An electronic instrument, to which the power supply apparatus is connected, has a control IC which sends a control signal to the gate terminal of the synchronous rectification device. When the synchronous rectification device is turned on, the output capacitor is charged and the direct current input power supply recovers power from the output capacitor through the transformer, thereby supplying output electric power set by the control IC to the electronic instrument.

4 Claims, 3 Drawing Sheets

FIGURE 1
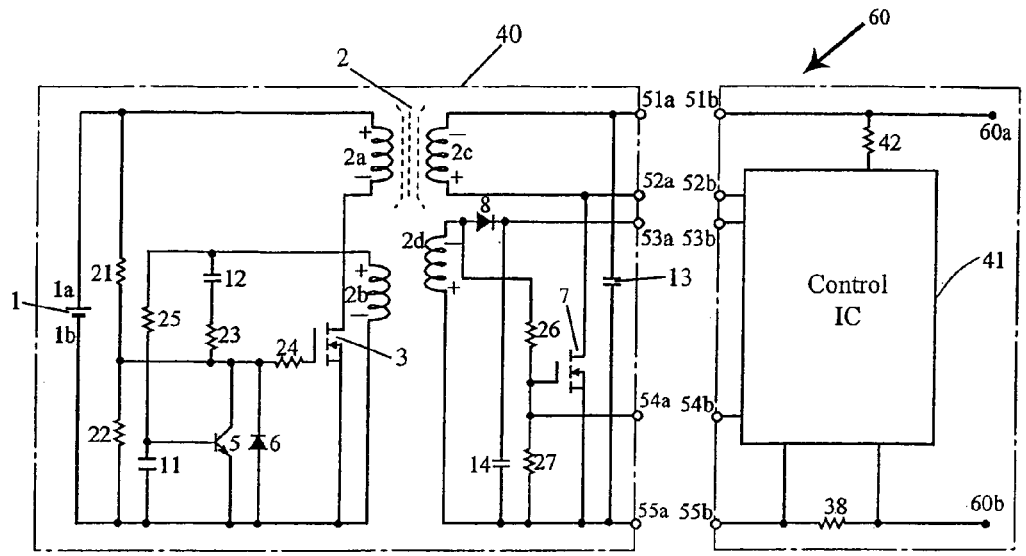
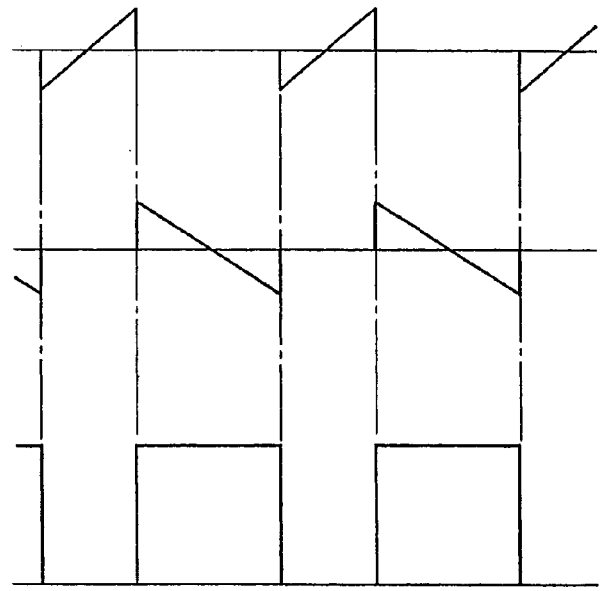
FIGURE 2A
FIGURE 2B
FIGURE 2C
6V
FIGURE 2D

FIGURE 3A
FIGURE 3B
FIGURE 3C
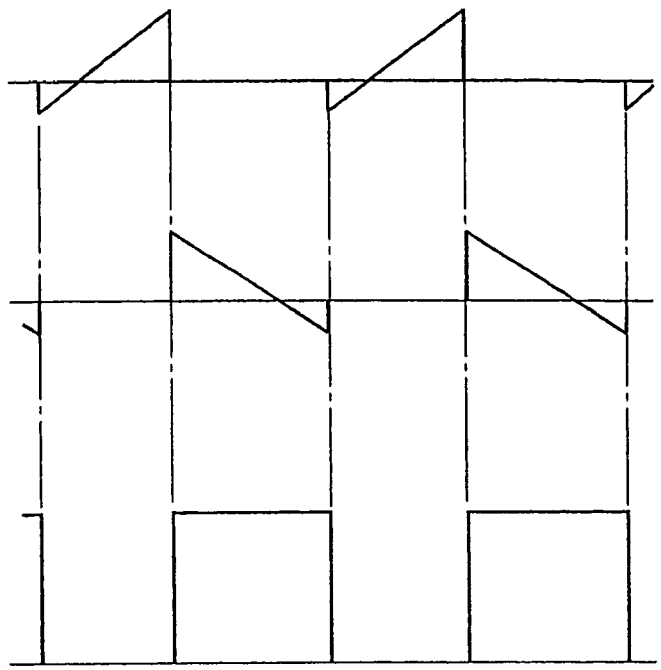
6V

FIGURE 4A
FIGURE 4B
FIGURE 4C
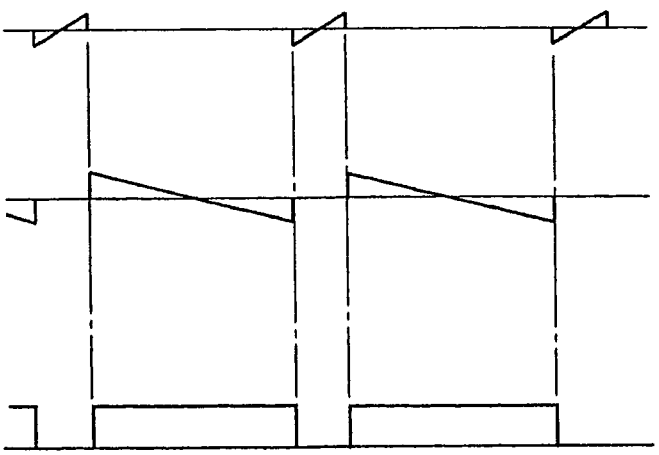
1.5V

SYNCHRONOUS RECTIFYING SWITCHING POWER SOURCE CIRCUIT

INCORPORATION BY REFERENCE

The present application claims priority under 35 U.S.C. §119 to Japanese Patent Application No. 2004-234818 filed on Aug. 11, 2004. The content of the application is incorporated herein by reference in its entirety.

FIELD OF THE INVENTION

The present invention pertains to a switching power supply which converts a direct current input voltage into a desired voltage and supplies the voltage to electronic instruments. The present invention specifically pertains to a synchronous rectification switching power supply circuit which performs a synchronous rectification.

BACKGROUND OF THE INVENTION

A power supply circuit instrument illustrated in FIG. 6 is an example of a conventional. switching power supply apparatus 10. In this switching power supply apparatus 10, a primary winding 2a of a transformer 2 and a main switching device 3 are serially connected between terminals 1a and 1b of a direct current input power supply 1, the positive terminal of the transformer 2 is connected to the positive terminal 1a of the direct current input power supply 1, and the negative terminal of the transformer 2 is connected to the main switching device 3. The main switching device 3 comprises a semiconductor device such as an MOS-FET. Further, between the terminals 1a and 1b of the direct current input power supply 1, resistors 21 and 22 are serially connected. A midpoint between the resistors 21 and 22 is connected to the gate of the main switching device 3 through a resistor 24.

Further, an auxiliary winding 2b is provided in the transformer 2. The positive terminal of the auxiliary winding 2b is connected to a series circuit comprising a resistor 25 and a capacitor 11. The other terminal of the capacitor 11 is connected to the negative terminal 1b of the direct current input power supply 1 and is also connected to the negative terminal of the auxiliary winding 2b. The positive terminal of the auxiliary winding 2b is connected to a series circuit comprising a capacitor 12 and a resistor 23. The other terminal of the resistor 23 is connected to the gate of the main switching device 3 through the resistor 24.

The collector of a transistor 5, which is for switching control, is connected to the gate of the main switching device 3 through the resistor 24. The emitter of the transistor 5 is connected to the negative terminal 1b of the direct current input power supply 1. The base of the transistor 5 is connected to a midpoint between the resistor 25 and the capacitor 11. In addition, between the collector and the base of the transistor 5, a light receiving device 35b of a photocoupler, which is discussed herein below, is connected. Moreover, between the gate and the source of the main switching device 3, a diode 6 is provided, whose cathode is connected to the collector of the transistor 5 and whose anode is connected to the negative side of the direct current input power supply 1.

On the other hand, the anode of a diode 4, which is for rectification, is connected to the negative side terminal of a secondary winding 2c of the transformer 2. Its cathode is connected to a terminal of an output capacitor 13 and also linked to an output terminal 20a. The other terminal of the output capacitor 13 is connected to the positive terminal of the secondary winding 2c and is also connected to an output terminal 20b through a resistor 38.

Between the output terminals 20a and 20b, resistors 30 and 31, which are for detecting an output voltage, are serially connected. A midpoint between the resistors 30 and 31 is connected to an inverting input terminal of an error amplifier 33a in an output voltage detection circuit 32. Moreover, a non-inverting input terminal of the error amplifier 33a is connected to a reference voltage 34a for the output voltage. In addition, the output from the error amplifier 33a is connected to the cathode of a light emitting diode 35a of the photocoupler. The anode of the light emitting diode 35a is connected to the output terminal 20a through a resistor 36.

Moreover, a terminal of the resistor 38 is connected to a non-inverting input terminal of an error amplifier 33b through a reference voltage 34b which is for setting an output current in an output current detection circuit 37. The other end of the resistor 38 is connected to an inverting input terminal of the error amplifier 33b. In addition, the output from the error amplifier 33b is connected to the cathode of the light emitting diode 35a.

As for the operations of the switching power supply apparatus 10, a voltage between the resistors 21 and 22 is applied to the gate of the main switching device 3, which is a MOS-FET, and turns on the main switching device 3. The auxiliary winding 2b and other components charge an integration circuit comprising the resistor 25 and the capacitor 11, whose charged potential turns on the transistor 5, which then turns off the main switching device 3. These operations repeat over and over. In addition, on the secondary side, while the main switching device 3 remains turned on, the output capacitor 13 is not charged, and when the main switching device 3 turns off, a flyback voltage appears across the secondary winding 2c and charges the output capacitor 13 with the energy stored in the secondary winding 2c.

As for the control of the output voltage and output current from the switching power supply apparatus 10, the output voltage detection circuit 32 and the output current detection circuit 37, which are provided on the secondary side, control the light emitting diode 35a of the photocoupler so as to turn it on and off. When the light emitting diode 35a turns on, the light receiving device 35b turns on and the charging duration of the capacitor 11 is adjusted. Thereby, the turn-on duration of the main switching device 3 is controlled through a feedback under a condition in which the device is electrically insulated from the output side, and hence, the main switching device 3 is controlled so as to provide a desired output voltage and current.

An example of the prior art is shown, e.g., in Japanese Laid Open Patent Application Publication No. 2000-350454.

SUMMARY OF THE INVENTION

In the conventional technologies described above, various circuit parameters are set within the switching power supply apparatus 10 in order to stably output the voltage and current which are required by an electronic instrument connected to the output terminals 20a and 20b. Therefore, such a power supply apparatus can deal only with a specific electronic instrument to be connected thereto and is inflexible. Such a power supply apparatus does not have versatility, and every time specifications of an electronic instrument are changed or a new instrument is released, it is necessary to provide a new power supply apparatus to be employed for such an instrument, requiring wasteful provisions.

The present invention was conceived, paying attention to the issues of the conventional technologies discussed hereinabove. The invention provides a synchronous rectification switching power supply circuit which enables an identical power supply apparatus to be utilized even when electronic instruments to be connected to the apparatus require different values of voltage and current and which has a simple circuit structure.

The present invention provides a synchronous rectification switching power supply circuit including a primary winding of a transformer and a main switching device, such as an MOS-FET, that are serially connected between both terminals of a direct current input power supply. A secondary winding of the transformer and a synchronous rectification device, such as an MOS-FET, on a secondary side of the transformer are serially connected between output terminals. The synchronous rectification switching power supply circuit also includes a power supply apparatus equipped with an output capacitor which is charged with a voltage which appears across the secondary winding of the transformer as the main switching device turns on and off and a control IC, which is a control section, to send a control signal to a gate terminal which is a control input terminal of the synchronous rectification device. The control section is provided in an electronic instrument, such as a portable instrument, e.g., a portable telephone handset, to which the power supply apparatus is connected so as to supply electric power thereto. When the synchronous rectification device is turned on, the output capacitor is charged and the direct current input power supply recovers electric power from the output capacitor through the transformer, thereby supplying output electric power which is set by the control section to the electronic instrument.

Both ends of the capacitor are connected to output terminals of the power supply apparatus, and when the electronic instrument is connected to the power supply apparatus, the control input terminal of the synchronous rectification device is connected to a control terminal which outputs the control signal which is sent by the control section.

Moreover, the present invention provides a synchronous rectification switching power supply circuit including a power supply apparatus formed by serially connecting a primary winding of a transformer and a main switching device between both terminals of a direct current input power supply. The transformer includes a secondary winding, and a synchronous rectification device on a secondary side of the transformer is serially connected with the secondary winding between output terminals. An output capacitor which is charged with a voltage which appears across the secondary side winding of the transformer as the main switching device turns on and off. The secondary winding, the synchronous rectification device and the output capacitor are provided in an electronic instrument to which the power supply apparatus supplies power. The synchronous rectification switching power supply circuit also includes a control section to send a control signal to a control input terminal of the synchronous rectification terminal, and the control section is provided in the electronic instrument. When the synchronous rectification device is turned on, the output capacitor is charged and the direct current input power supply recovers electric power from the output capacitor through the transformer, thereby supplying output electric power which is set by the control section to the electronic instrument. Energy is transferred between the power supply apparatus and the electronic instrument through a magnetic coupling between a primary side and the secondary side of the transformer.

The synchronous rectification switching power supply circuit according to the present invention enables an identical power supply apparatus to be utilized even when electronic instruments that can be connected to the apparatus require different values of voltage and current. Thereby, a switching power supply apparatus with a simple circuit structure and high versatility can be provided, and it is possible to efficiently utilize such a power supply apparatus without wasteful provisions.

BRIEF DESCRIPTION OF THE FIGURES

The foregoing and other features of the present invention will be more readily apparent from the following detailed description and drawings of the illustrative embodiments of the invention wherein like reference numbers refer to similar elements and in which:

FIG. 1 is a simplified circuit diagram of a synchronous rectification switching power supply circuit according to an embodiment of the present invention;

FIGS. 2A–2D is a simplified timing chart which illustrates the waveforms for explaining operations of the synchronous rectification switching power supply circuit according to an embodiment of the present invention;

FIGS. 3A–3D is a simplified timing chart which illustrates other waveforms for explaining operations of the synchronous rectification switching power supply circuit according to an embodiment of the present invention;

FIGS. 4A–4D is a simplified timing chart which illustrates yet other waveforms for explaining operations of the synchronous rectification switching power supply circuit according to an embodiment of the present invention;

DESCRIPTION OF THE PREFERRED EMBODIMENTS

Figure 6:
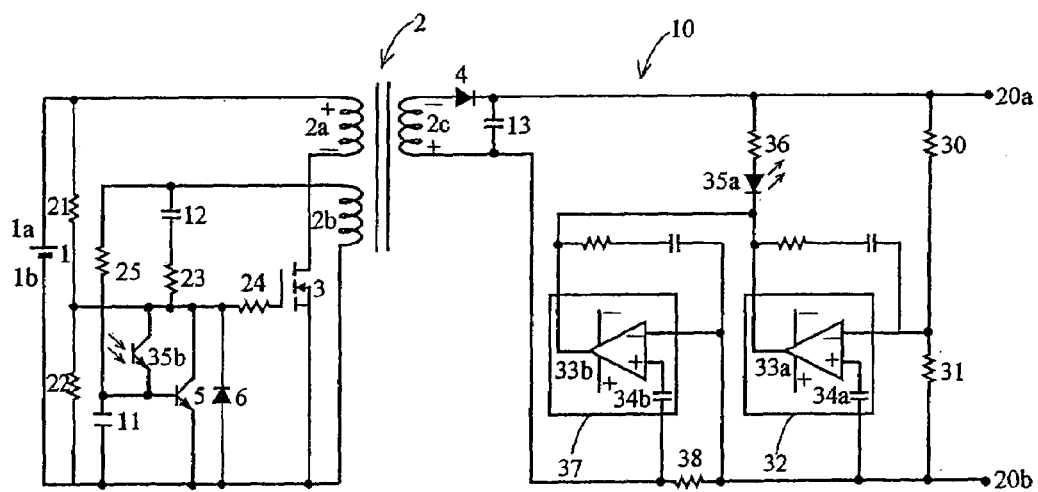
FIG. 6 is a simplified circuit diagram of a conventional synchronous rectification switching power supply circuit.

Embodiments of the present invention are explained hereafter referencing the figures. FIG. 1 depicts a flyback-type synchronous rectification switching power supply circuit according to an embodiment of the present invention. Components which are identical to those in the circuit illustrated in FIG. 6 are explained using the same numeral designators. Regarding a power supply apparatus 40 of the present synchronous rectification switching power supply circuit, in the same manner as in the circuit in FIG. 6, in the primary-side circuit, a primary winding 2a of a transformer 2 and a main switching device 3 are serially connected between terminals 1a and 1b of a direct current input power supply 1, the positive terminal of the transformer 2 is connected to the positive terminal 1a of the direct current input power supply 1, and the negative terminal of the transformer 2 is connected to the main switching device 3. The main switching device 3 comprises a semiconductor device for electric power control such as a MOS-FET. Its drain is connected to the negative terminal of the primary winding 2a, and its source is connected to the negative terminal 1b of the direct current input power supply 1. Further, between the terminals 1a and 1b of the direct current input power supply 1, resistors 21 and 22 are serially connected. A midpoint between the resistors 21 and 22 is connected to the gate of the main switching device 3, which is a control input terminal of the main switching device 3, through a resistor 24.

Further, the transformer 2 has an auxiliary winding 2b. The positive terminal of the auxiliary winding 2b is connected to a terminal of a resistor 25 in a series circuit comprising the resistor 25 and a capacitor 11. The other terminal of the capacitor 11 is connected to the negative terminal 1b of the direct current input power supply 1, and is also connected to the negative terminal of the auxiliary winding 2b. The positive terminal of the auxiliary winding 2b is connected to a series circuit comprising a capacitor 12 and a resistor 23. The other terminal of the resistor 23 is connected to the gate of the main switching device 3 through the resistor 24.

To the gate of the main switching device 3, the collector of a transistor 5, which is for switching control of the present power supply apparatus 40, is connected through the resistor 24. The emitter of the transistor 5 is connected to the negative terminal 1b of the direct current input power supply 1. The base of the transistor 5 is connected to a midpoint between the resistor 25 and the capacitor 11. Moreover, a diode 6 is connected between the gate and source of the main switching device 3. The cathode of the diode 6 is connected to the collector of the transistor 5, and the anode of the diode 6 is connected to the negative side of the direct current input power supply 1.

Moreover, as for a secondary winding 2c of the transformer 2, its negative terminal is connected to a terminal of an output capacitor 13. The positive terminal of the secondary winding 2c is connected to the drain of a synchronous rectification device 7 which comprises a MOS-FET. The source of the synchronous rectification device 7 is connected to the other terminal of the output capacitor 13. The ends of the output capacitor 13 are connected to output terminals 51a and 55a of the present power supply apparatus 40, respectively.

Further, the transformer 2 has an auxiliary winding 2d. The anode of a diode 8 for rectification is connected to the negative terminal of the auxiliary winding 2d. The cathode of the diode 8 is connected to a terminal of an output capacitor 14 which outputs electric power for the purpose of control. To both ends of the auxiliary winding 2d, a series circuit comprising resistors 26 and 27 is also connected. A midpoint between the resistors 26 and 27 is connected to the gate of the synchronous rectification device 7, which is a control input terminal of the synchronous rectification device 7.

In addition to the output terminals 51a and 55a, the present power supply apparatus 40 has a phase detection terminal 52a which is connected to the positive terminal of the secondary winding 2c, an output terminal 53a to output electric power for the purpose of control, and a control terminal 54a which is connected to the gate of the synchronous rectification device 7 and which drives and controls the synchronous rectification device 7.

An example of an electronic instrument 60 to be connected to the present power supply apparatus 40 is a portable terminal apparatus such as a cell phone. The electronic instrument 60 is equipped with a control IC 41 which controls the output electric power from the power supply apparatus 40. The electronic instrument 60 is equipped with terminals 51b and 55b which respectively correspond to the output terminals 51a and 55a, and which are connected thereto in such a manner that the terminals 51b and 55b can be freely connected to and disconnected from the output terminals 51a and 55a, respectively. Further, the electronic instrument 60 is equipped with terminals 52b, 53b, and 54b which respectively correspond to the phase detection terminal 52a, the output terminal 53a to output electric power for the purpose of control, and the control terminal 54a, and which are connected thereto in such a manner that the terminals 52b, 53b, and 54b can be freely connected to and disconnected from the terminals 52a, 53a and 54a, respectively. The terminals 51b and 55b are connected to output terminals 60a and 60b, respectively, which supply electric power to circuits in the electronic instrument 60. In addition, the terminal 51b is connected to an output current setting circuit in the control IC 41, which is not illustrated in the figure, through a resistor 42. Moreover, a resistor 38 is provided between the terminal 55b and the output terminal 60b. Both ends of the resistor 38 are connected to the output current setting circuit in the control IC 41 which is not illustrated in the figure. Moreover, the terminal 52b is connected to a phase detection circuit in the control IC 41. The terminal 53b is connected to a power supply terminal of the control IC 41. The terminal 54b is connected to a control output circuit in the control IC 41 which is not illustrated in the figure and which controls the turn-on duration of the synchronous rectification device 7.

As for the operations of the synchronous rectification switching power supply circuit in the present embodiment, a voltage which appears between resistors 21 and 22 is applied to the gate of the main switching device 3 which is a MOS-FET and turns on the main switching device 3. The auxiliary winding 2b charges an integration circuit comprising the resistor 25 and the capacitor 11, whose charged potential turns on the transistor 5, which then turns off the main switching device 3. The processes above repeat with a certain period. In addition, on the secondary side, while the main switching device 3 remains turned on, the output capacitors 13 and 14 are not charged. When the main switching device 3 turns off, flyback voltages appear across the secondary winding 2c and the auxiliary winding 2d, respectively, and charge the output capacitors 13 and 14 with the energy stored in the secondary winding 2c and the auxiliary winding 2d, respectively.

Here regarding the output capacitor 13, when the synchronous rectification device 7 remains turned on even after the energy in the secondary winding 2c finishes charging the output capacitor 13, the direct current input power supply 1 on the primary side recovers a part of the electric power in the output capacitor 13 through the synchronous rectification device 7 and the secondary winding 2c. In the present embodiment, the output voltage and current of the power supply apparatus 40 are controlled by utilizing these recovery operations. In other words, the control IC 41 of the electronic instrument 60 controls the turn-on duration during which a voltage is applied to the gate of the synchronous rectification device 7 through the control terminals 54b and 54a and allows the direct current input power supply 1 on the primary side to recover a part of the output electric power from the output capacitor 13 through the synchronous rectification device 7, thereby controlling the output voltage at the output terminal 51a to match the voltage value which is set by the resistor 42. Similarly, the output current is controlled to match the current value which is set by the resistor 38.

Next, examples of the control operations are explained referencing FIGS. 2–4. The first is a case in which the electronic instrument 60 requires a relatively low load, such as an output voltage of 6V and an output current of 0.01 A. The control signal from the control IC 41 as illustrated in FIG. 2C is provided to the control terminal 54a and sets the turn-on duration of the gate of the synchronous rectification device 7. During the turn-on duration, the gate remains turned on even after a flyback voltage across the secondary winding 2c charges the output capacitor 13. The turn-on duration is for adjusting the output voltage of the output capacitor 13 to match the value which is set by the resistor 42. Thereby, as illustrated in FIG. 2B, the current through the secondary winding 2c flows in the positive direction and then, a recovery current flows in the negative direction. The amount of current which the electronic instrument 60 consumes in this case is small, and hence, almost the same amount of current as the current for charging the output capacitor 13 is recovered. In addition, regarding the current flowing through the primary winding 2a, as illustrated in FIG. 2A, a recovery current flows toward the direct current input power supply 1 as the main switching device 3 turns on, and then the current flows in the positive direction. Thus, as illustrated in FIG. 2D, the output voltage is maintained at the desired value of 6V.

Figure 3D:

Moreover, in the following case, the electronic instrument 60 requires the maximum load such as an output voltage of 6V and an output current of 0.6 A. The control signal from the control IC 41, which is illustrated in FIG. 3C, is applied to the control terminal 54a and sets the turn-on duration of the gate of the synchronous rectification device 7. The gate remains turned on during the turn-on duration as well as after the flyback voltage across the secondary winding 2c charges the output capacitor 13. The turn-on duration of the gate after the output capacitor 13 is charged is relatively short, however. Therefore, as illustrated in FIG. 3B, a larger portion of the current through the secondary winding 2c flows in the positive direction. The amount of the current to be consumed by the electronic instrument 60 in this case is large and hence, the amount of a recovery current after the output capacitor 13 is charged is small. The recovery current flows in the negative direction for a certain short period. In addition, regarding the current flowing through the primary winding 2a, as illustrated in FIG. 3A, a small amount of recovery current flows toward the direct current input power supply 1 when the main switching device 3 turns on and then, a large amount of current flows in the positive direction. In this case as well, as illustrated in FIG. 3D, the output voltage is maintained at the desired value of 6V. Moreover, when different values are set for the output voltage and current, the desired values of current and voltage can be maintained due to these recovery operations.

Figure 4D:
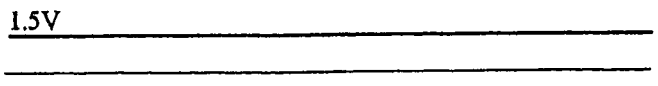

Moreover, when the electronic instrument 60 is not connected to the power supply apparatus 40, the voltage across the auxiliary winding 2d charges the gate capacitance of the synchronous rectification device 7 and stabilizes at a value at which the synchronous rectification device 7 turns on, as illustrated in FIG. 4C. The synchronous rectification device 7 remains turned on until the main switching device 3 turns on. In addition, regarding the current flowing through the secondary winding 2c, as illustrated in FIG. 4D, a nearly equal amount flows in the positive and negative directions. As for the current flowing through the primary winding 2a, a recovery current flows as illustrated in FIG. 4A and, there is almost no energy to be consumed. Moreover, the voltage appearing at the output terminal 51a is determined based on the ratio of the windings in the transformer 2.

According to the synchronous rectification switching power supply circuit in the present embodiment, the output from the control terminal 54b of the electronic instrument 60 controls the turn-on duration of the gate of the synchronous rectification device 7 and during the turn-on duration, the energy charged in the output capacitor 13 is recovered on the primary side, thereby maintaining the output voltage and current at desired values. Hence, it is possible to supply different voltages and currents to different electronic instruments utilizing the same circuit in the power supply apparatus 40. Therefore, the power supply apparatus 40 can have versatility and a single power supply apparatus 40 can deal with variety of electronic instruments.

Figure 5:
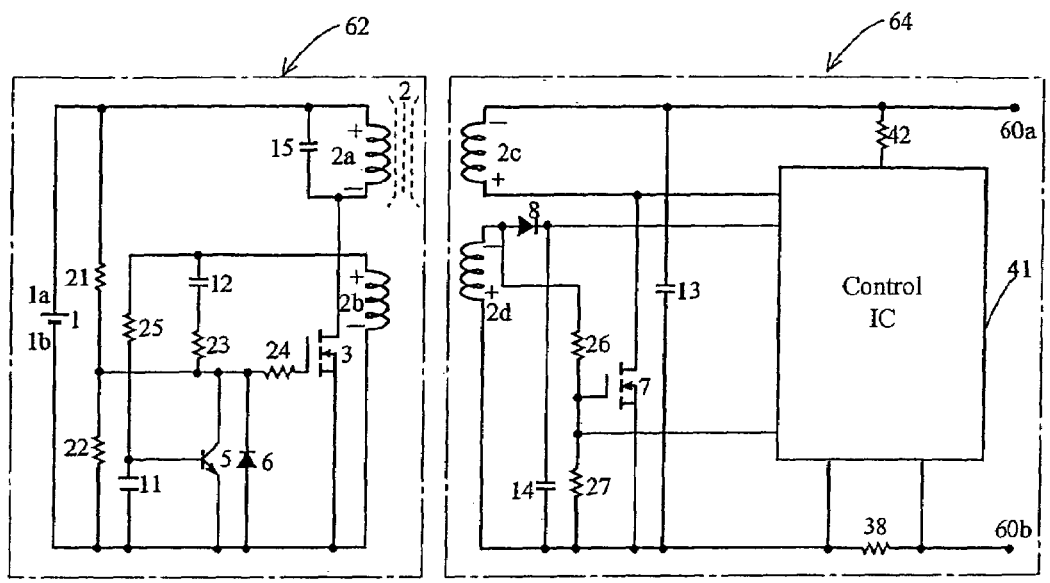
FIG. 5 is a simplified circuit diagram of a synchronous rectification switching power supply circuit according to another embodiment of the present invention.

Furthermore, in addition to the embodiment mentioned above, the synchronous rectification switching power supply apparatus according to the present invention may be divided to a power supply apparatus 62 and an electronic instrument 64 between a primary winding 2a and a secondary winding 2c of a transformer 2, as illustrated in FIG. 5. In this case, the energy from a direct current voltage supply 1 on the primary side is transferred through a magnetic coupling circuit comprising coils. The other structures of the circuit are identical to those in the previous embodiment discussed herein above. Moreover, a capacitor 15 for the purpose of protection is connected between both ends of the primary winding 2a.

The present embodiment enables energy to be supplied to the electronic instrument 64 without providing contact points. At the same time, in the same manner as in the previously described embodiment, the electronic instrument 64 can control the current and voltage, and the power supply apparatus 62 with high versatility can be provided.

Moreover, the present invention is not limited to the power supply circuits in the embodiments discussed herein above, and the structures of the circuits can be appropriately altered.

What is claimed is:

1. A synchronous rectification switching power supply circuit comprising:
   a transformer comprising a primary winding and a secondary winding;
   a main switching device serially connected to the primary winding of the transformer between terminals of a direct current input power supply;
   a synchronous rectification device serially connected to the secondary winding of the transformer on a secondary side of the transformer between output terminals;
   a power supply apparatus comprising an output capacitor charged with a voltage which appears across the secondary winding of the transformer as the main switching device turns on and off;
   a control section that sends a control signal to a control input terminal of the synchronous rectification device, the control section being provided in an electronic instrument to which the power supply apparatus is connected so as to supply electric power thereto; and
   an auxiliary winding, the auxiliary winding being coupled in parallel with an output capacitor, with a resistive circuit, and between a first control terminal of the control section and one of the output terminals;
   wherein when the synchronous rectification device is turned on, the output capacitor is charged and the direct current input power supply recovers electric power from the output capacitor through the transformer, thereby supplying output electric power which is set by the control section to the electronic instrument, and
   wherein the synchronous rectification device is further coupled to the resistive circuit, such that a voltage may be produced across the auxiliary winding for charging a gate capacitance of the synchronous rectification device when the electronic instrument is disconnected from the power supply apparatus.

2. The synchronous rectification switching power supply circuit according to claim 1, wherein: both ends of the output capacitor are connected to output terminals of the power supply apparatus, and when the electronic instrument is connected to the power supply apparatus, the control input terminal of the synchronous rectification device is connected to a second control terminal which outputs the control signal which is sent by the control section.

3. A synchronous rectification switching power supply circuit comprising:

a power supply apparatus formed by serially connecting a primary winding of a transformer and a main switching device between both terminals of a direct current input power supply;

a secondary winding of the transformer;

a synchronous rectification device on a secondary side of the transformer which is serially connected with the secondary winding between output terminals;

an output capacitor which is charged with a voltage which appears across the secondary side winding of the transformer as the main switching device turns on and off, the secondary winding, the synchronous rectification device and the output capacitor being provided in an electronic instrument to which the power supply apparatus supplies power; and a control section which sends a control signal to a control input terminal of the synchronous rectification device, the control section being provided in the electronic instrument; and an auxiliary winding, the auxiliary winding being coupled in parallel with an output capacitor, with a resistive circuit, and between an first control terminal of the control section and one of the output terminals, wherein when the synchronous rectification device is turned on, the output capacitor is charged and the direct current input power supply recovers electric power from the output capacitor through the transformer, thereby supplying output electric power which is set by the control section to the electronic instrument, and wherein the synchronous rectification device is further coupled to the resistive circuit, such that a voltage may be produced across the auxiliary winding for charging a gate capacitance of the synchronous rectification device when the electronic instrument is disconnected from the power supply apparatus.

4. The synchronous rectification switching power supply circuit according to claim 3, wherein energy is transferred between the power supply apparatus and the electronic instrument through a magnetic coupling between a primary side and the secondary side of the transformer.

* * * * *